United States Patent

Van Geel et al.

[11] Patent Number: 5,600,189
[45] Date of Patent: Feb. 4, 1997

[54] ELECTROMAGNETIC ACTUATOR HAVING A CYLINDRICAL TRANSLATION COIL AND A TOROIDAL ROTATION COIL, ACTUATOR UNIT COMPRISING THE ACTUATOR AND A MEASUREMENT SYSTEM, AND MACHINE COMPRISING THE ACTUATOR OR THE ACTUATOR UNIT

[75] Inventors: Johannes M. A. M. Van Geel; Johan C. Compter, both of Eindhoven, Netherlands; Volker Kessler, Freiberg, Germany

[73] Assignee: U.S. Philips Corporation, New York, N.Y.

[21] Appl. No.: 499,850

[22] Filed: Jul. 6, 1995

[30] Foreign Application Priority Data

Jul. 14, 1994 [EP] European Pat. Off. ............... 94202036

[51] Int. Cl.⁶ .............................. H02K 1/12; H02K 1/22
[52] U.S. Cl. .......................... 310/40 R; 310/12; 310/13; 310/179; 310/190; 310/191; 318/115; 29/739; 29/744; 29/834
[58] Field of Search ................................. 310/12, 13, 14, 310/40 R, 199, 191, 112, 256, 266, 179, 190; 318/115; 29/739, 744, 834, 740

[56] References Cited

U.S. PATENT DOCUMENTS

| 3,745,433 | 7/1973 | Kelby, Jr. et al. ................ 318/115 |
| 4,234,831 | 11/1980 | Kemmer et al. ................ 318/115 |
| 4,286,181 | 8/1981 | Guzman et al. ................ 310/49 R |
| 4,607,197 | 8/1986 | Conrad ................ 318/115 |
| 5,068,554 | 11/1991 | Mohn ................ 310/12 |
| 5,093,596 | 3/1992 | Hammer ................ 310/191 |
| 5,105,932 | 4/1992 | Bryson, III et al. ................ 198/619 |
| 5,160,877 | 11/1992 | Fujiwara et al. ................ 318/568 |
| 5,315,751 | 5/1994 | Hammer ................ 29/598 |

FOREIGN PATENT DOCUMENTS

| 0235045 | 9/1987 | European Pat. Off. ....... H05K 13/04 |
| 0482321 | 4/1992 | European Pat. Off. ....... H02K 41/03 |
| 2451718 | 5/1976 | Germany. |

Primary Examiner—Steven L. Stephan
Assistant Examiner—Karl Imagoshi Tamai
Attorney, Agent, or Firm—Edward Blocker

[57] ABSTRACT

An electromagnetic actuator (1) comprises two actuator sections which are translatable relative to one another along an actuator axis (1a) and which are rotatable about the actuator axis, a first actuator section (1) comprising a coil system and a second actuator section (3) comprising a permanent magnet system for cooperation with the coil system via an air gap. The coil system is arranged on a magnetically conductive yoke (5) and comprises a cylindrical translation coil (9) and a toroidal rotation coil (7), which are coaxial with the actuator axis. The permanent magnet system comprises an annular magnet (11), which is coaxial with the actuator axis, for cooperation with both the translation coil and the rotation coil. The magnet has a radial magnetisation (B) which is interrupted by an annular segment (13). The magnetically conductive yoke has a central core (5b) around which the translation coil is arranged and a shell (5a) on which the rotation coil is disposed. The core and shell bound a space within which the annular magnet is disposed, the magnetically conductive yoke comprising a bridge (5c) connecting the central core and the shell.

12 Claims, 6 Drawing Sheets

ELECTROMAGNETIC ACTUATOR HAVING A CYLINDRICAL TRANSLATION COIL AND A TOROIDAL ROTATION COIL, ACTUATOR UNIT COMPRISING THE ACTUATOR AND A MEASUREMENT SYSTEM, AND MACHINE COMPRISING THE ACTUATOR OR THE ACTUATOR UNIT

BACKGROUND OF THE INVENTION

1. Field of the Invention

The invention relates to an electromagnetic actuator comprising two actuator sections which are translatable relative to one another along an actuator axis and which are rotatable about the actuator axis, a first actuator section comprising a coil system and a second actuator section comprising a permanent magnet system for cooperation with the coil system via an air gap.

2. Description of the Related Art

DE-A 24 51 718 diagrammatically shows an electric motor having an armature capable of performing both rotational and translational movements relative to a stator. The armature comprises a plurality of permanent magnets and the stator is made up of a plurality of stator segments with driving coils. An electronic circuit is proposed for the selective energisation of the driving coils.

SUMMARY OF THE INVENTION

It is an object of the invention to provide an electromagnetic actuator which in a simple manner is capable of performing translational and rotational movements.

To this end the electromagnetic actuator in accordance with the invention is characterised in that the coil system is arranged on a magnetically conductive yoke and comprises a cylindrical translation coil and a toroidal rotation coil, which are coaxial with the actuator axis, and the permanent magnet system comprises an annular magnet, which is coaxial with the actuator axis, for cooperation with both the translation coil and the rotation coil, which magnet has a radial magnetisation which is interrupted by an annular segment, the magnetically conductive yoke having a central core around which the translation coil is arranged and a shell on which the rotation coil is disposed, which core and shell bound a space within which the annular magnet is disposed, the magnetically conductive yoke comprising a bridge connecting the central core and the shell.

In an actuator or motor capable of performing translational and rotational movements two mutually perpendicular driving forces are needed, one of these forces being used for translation and the other force being used for generating a torque for the purpose of rotation. When in the actuator in accordance with the invention the coils are energised two mutually perpendicular driving forces can be generated by coil sections which extend transversely of one another and pass through one magnetic field. An advantage of this is that a compact and simple construction is possible because the required coils, i.e. the cylindrical coil and the toroidal coil, are not superposed. Both coils are situated at the same level or in the same area, the annular magnet extending preferably between the two coils. The helical turns of the cylindrical coil, which are arranged around the central core, produce translational movements when energised. The turns of the in itself discontinuous toroidal coil produce rotational movements when energised. Advantages are that the moving mass can be small and the production costs of the actuator are low owing to its simplicity. Another advantage is that the driving forces thus generated can be highly independent of positional changes of one actuator section relative to the other actuator section.

The actuator in accordance with the invention has a translational excursion dictated by the axial dimensions of the magnet and the cylindrical coil and a rotational excursion dictated by the tangential dimensions of the annular segment and the toroidal coil, i.e. the dimensions viewed in the circumferential direction of the actuator. To minimise the power dissipation it may be desirable to use more than one translation coil element and/or rotation coil element in the case of a comparatively large translational excursion and/or rotational excursion, so that less electric power is needed to obtain a given force or torque.

Since the annular segment of the actuator in accordance with the invention produces a flux variation in the toroidal coil during rotations this segment should always be disposed within the solid angle defined by the toroidal coil. The translational and rotational movements of one actuator section relative to the other actuator section can be performed independently of one another without any problem.

Preferably, the actuator has an end surface oriented transversely of the actuator axis for guiding a drive member, which is secured to the movable actuator section, in an outward direction. The bridge connecting the central core and the shell is preferably disposed at an end surface opposite the open end surface. The central core of the magnetically conductive yoke, particularly a yoke of a soft-magnetic material, may have a central channel for receiving bearing means for the movable actuator section.

An embodiment of the actuator in accordance with the invention is characterised in that the shell is formed by an interrupted cylindrical wall of a magnetically conductive material. Thus, it is achieved that the torque generated for a given value of the electric current through the translation coil is substantially independent of the relative rotational position of the actuator sections. In this respect, it is preferred that the shell has a slot-shaped gap situated near the bridge and extending parallel to the actuator axis. For the rigidity of the shell the gap may be filled with a non-magnetisable material.

An embodiment of the actuator in accordance with the invention is characterised in that the annular segment is formed by a discontinuity in the annular magnet. In order to obtain a homogeneous mass distribution over the circumference of the magnet system the discontinuity may be filled by a non-magnetic annular segment. The last-mentioned step also improves the rigidity of the magnet system.

An embodiment of the actuator in accordance with the invention is characterised in that the annular magnet and the annular segment together form a continuous ring, the annular segment being magnetised oppositely to the annular magnet. The segment completing the ring, which segment is magnetised oppositely to the rest of the ring, produces a larger torque, particularly a torque which is twice as large, in the direction of rotation owing to an increase, i.e. doubling, of the variation of the magnetic flux linked by the toroidal coil in comparison with the situation in which the segment is not magnetised. Moreover, the annular magnet has a homogeneous mass distribution and a high rigidity, which has a favourable effect on the dynamic characteristics of the actuator.

An embodiment of the actuator in accordance with the invention is characterised in that the first actuator section is a stationary section. In this practical embodiment the magnet system, which may comprise a permanent magnet of a material known per se, for example NbFeB, is arranged to be movable relative to the coil system. This has the advantage that no connecting wires are connected to movable parts.

It is to be noted that from EP 0,482,321 a combination motor is known, having a linear section on which a rotational section is stacked. Each section has a separate stator and a separate rotor, the stators of the two sections being secured to one another and the rotors being secured to a common drive shaft. The drive shaft can perform a translational movement along and a rotational movement about its central axis. A disadvantage of this known motor is the large axial dimension of the construction as a result of two stacked motor sections. Another disadvantage is the large mass of the movable section owing to the necessity of using two rotors. A further disadvantage is that for each motor sector at least two amplifiers are needed to enable the desired translations and rotations to be realised.

The invention further relates to an actuator unit comprising an actuator in accordance with the invention and a measurement system for determining a translational position and a rotational position of one actuator section relative to the other actuator section. To control the movement of the movable section of the actuator in accordance with the invention it is necessary to determine the position of the movable actuator section relative to the stationary actuator section during operation. For this purpose a measurement system is used which is capable of two-dimensional measurement.

An embodiment of the actuator unit in accordance with the invention is characterised in that the measurement system comprises a cylindrical information carrier disposed on one of the actuator sections and having a pattern of first transparent areas, and a unit disposed on the other actuator section and having a mask with a pattern of second transparent areas, a radiation source system and a radiation-sensitive sensor system arranged opposite the radiation source system, the pattern of first transparent areas and the pattern of second transparent areas, which extends parallel to said pattern of first transparent areas, extend between the radiation source system and the sensor system. The radiation-source system generally comprises a plurality of radiation sources and the sensor system comprises a plurality of sensors. The rotation of the information carrier will result in intensity transitions being observed in the sensors. If a visible radiation beam, i.e. a light beam, is used the intensity transitions will be dark-light transitions. The measurement system can detect both translational and rotational movements. Translational movements are detected in that the sensors can observe the radiation sources, e.g. light sources, via the second transparent areas in the mask through the information carrier.

The first transparent areas may be formed by small apertures and the second transparent areas preferably take the form of slits. In the case of slits which extend perpendicularly to the translational movements intensity transitions will be observed when the information carrier is translated. In the case of slits which extend perpendicularly to the rotational movements intensity transitions will be observed when the information carrier is rotated. These intensity transitions are utilised to detect the positions of said transparent areas relative to one another.

The optical measurement system used in the actuator system in accordance with the invention has the special advantage that it can measure translational movements and rotational movements simultaneously and independently of one another.

A practical embodiment of the actuator unit in accordance with the invention is characterised in that the radiation source is a light-emitting diode and the sensor is a photodiode.

An embodiment of the actuator unit in accordance with the invention is characterised by the presence of a control system comprising means for the comparison of an output signal of the measurement system, which output signal is representative of an actual translational position, with a signal representative of a desired translational position (set-point; Sollwert), resulting in a first difference signal, and for the comparison of an output signal of the measurement system, which output signal is representative of an actual rotational position, with a signal representative of a desired rotational position (set-point; Sollwert), resulting in a second difference signal, which difference signals are applied to a control unit for controlling the translation coil and the rotation coil.

An advantage of this embodiment is the absence of electrical wiring between the two actuator sections. Moreover, carbon brushes and/or wipers can be dispensed with. Besides, each coil requires only a single-phase drive.

The invention further relates to a machine for picking up and positioning an object, such as for example a manipulator or a machine for mounting electronic components on a printed circuit board.

Such a machine for mounting electronic components has several functions. A first function may be the accurate placement and alignment of a component in such a manner that the terminals contact and coincide with the printed conductors of the printed circuit board. A second function may be to press the relevant component onto the printed circuit board.

According to the invention the machine for picking up and positioning an object comprises an actuator in accordance with the invention or an actuator unit in accordance with the invention.

It is to be noted that EP 0,235,045 discloses a machine for picking up and mounting components, which comprises a housing accommodating a linear motor and a rotary motor, and gripper means secured to the housing. Two hollow drive shafts are telescopically connected to a vacuum device via a vacuum tube. The linear motor comprises a coil mounted on a first drive shaft and a fixedly arranged set of cylindrical permanent magnets. When said coil is energised the drive shafts can be moved in an axial direction. The rotary motor comprises a coil mounted on an inner wall of the housing and a rotor mounted on the second drive shaft. When the last-mentioned coil is energised the second drive shaft can be rotated about its longitudinal axis. The gripper means secured to the housing comprise fingers which can be opened or closed by an axial movement of the drive shafts and which can be rotated by a rotation of the second drive shaft about the longitudinal axis of the machine. A disadvantage of this machine is the large axial dimension owing to the stacked motors. Another disadvantage is the large mass of the common translatable and rotatable element of the two motors.

BRIEF DESCRIPTION OF THE DRAWINGS

The invention will now be described in more detail, by way of example, with reference to the drawings, in which.

DESCRIPTION OF THE PREFERRED EMBODIMENTS

Figure 1:
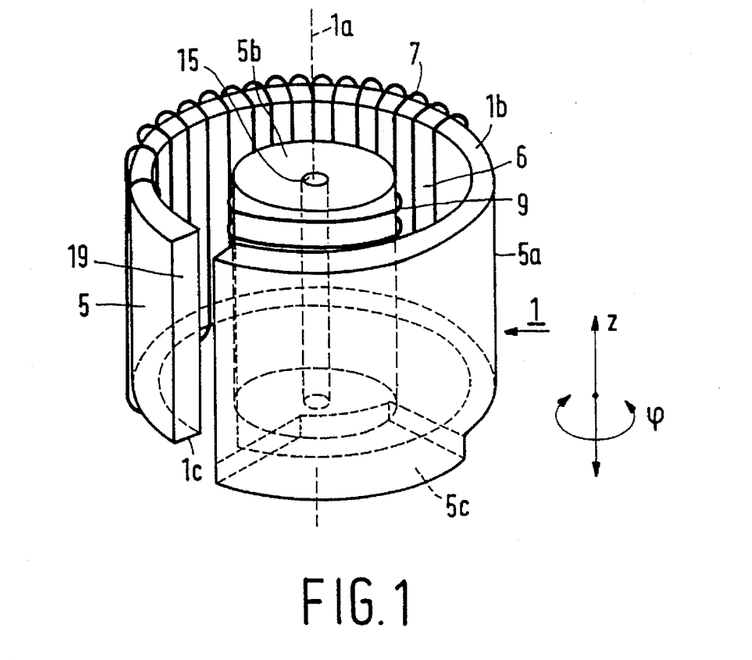
FIG. 1 is a diagrammatic perspective view showing a stationary actuator section of a first embodiment of the electromagnetic actuator in accordance with the invention.
Figure 2:
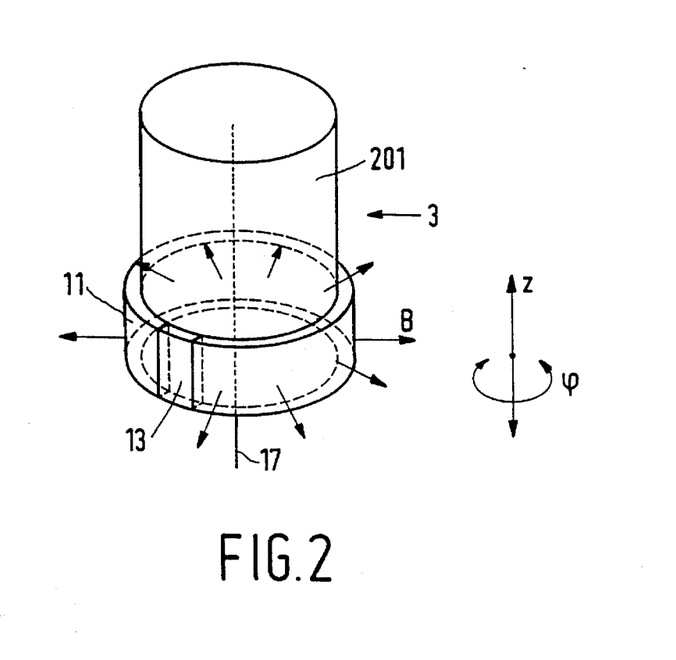
FIG. 2 is a diagrammatic perspective view showing a movable actuator section of the first embodiment.

The electromagnetic actuator in accordance with the invention shown in FIGS. 1 and 2 comprises a stationary first actuator section 1 and a second actuator section 3 which is movable relative to this first part. The stationary actuator section 1 comprises a soft-magnetic yoke 5 e.g. an iron yoke, having a cylindrical wall or shell 5a, a central core 5b and a bridge 5c connecting the cylindrical shell 5a to the central core 5b. The actuator 1 has an actuator axis 1a and two end surfaces 1b and 1c, the bridge 5c extending near or in the plane of the end surface 1c. The shell 5a is provided with turns opposite the bridge 5c to form a toroidal coil 7. The core 5b is provided with turns to form a cylindrical coil 9. The movable actuator section 3 comprises an annular permanent magnet 11 which, except for an annular segment 13 has an outwardly directed radial magnet field B. The magnet 11 is preferably made from a high-grade magnetic material, such as neodymium-iron-boron. The annular segment 13 may be of a non-magnetic material but is preferably made of a magnetic material which is radially magnetised in an opposite direction relative to the annular magnet 11.

In the assembled condition the actuator section 3 extends in a space present between the shell 5a and the core 5b of the actuator section 1. For this purpose the actuator section 1 comprises bearing means, for example an axial through-bore 15 in the core 5b for rotatably and translatably mounting a bearing shaft 17 of the second actuator section 3. Air gaps are formed between the magnet 11 and the toroidal coil 7 and between the magnet 11 and the cylindrical coil 9. The magnet 11 is oriented in such a manner relative to the toroidal coil 7 that the annular segment 13 is always disposed opposite turns of the toroidal coil 7 for a continuous development of power. For this purpose means limiting the rotational excursion may be provided.

When the cylindrical coil 9 is energised an axially directed continuous force on the magnet 11 is exerted for moving the second actuator section 3 in the Z direction. The shell 5a and the core 5b are at the same magnetic potential owing to the presence of the bridge 5c. When the coil 9 is energised the field lines of this coil propagate from the core 5b, via the bridge 5c, to the shell 5a and subsequently cross the space 6 in which the magnet 11 is disposed. The field lines from the magnet 11 take a similar path to that of the coil 9. The axially directed Lorentz force is produced because the number of turns of the energised coil 9 linked by the magnetic flux changes when the magnet 11 is moved in the Z direction. When the turns are arranged regularly the magnitude of the generated Lorentz force is substantially independent of the location of the magnet 11 in the space 6.

The shell 5a has an axial slot-shaped gap or slot 19. When the toroidal coil 7 is energised a magnetic field is produced in this coil, whose field lines propagate from the shell 5a, via the space coil 9 space P, to the core 5b, from where they return to the shell 5a via the bridge 5c. The gap 19 in the shell 5a ensures that the magnetic flux passes to the bridge 5c through the shell 5a in only one direction. The field lines from the magnet 11 take a path which extends from the magnet 11 to the shell 5a via an air gap, from the shell 5a to the core 5b via the bridge 5c, and finally from the core 5b to the magnet 11 via an air gap. Owing to the presence of the annular segment 13 the flux linkage in the coil 7 changes when the actuator section 3 is rotated in the φ direction. This flux variation is necessary for the development of a force in the tangential direction. When the coil 7 is energised a tangentially directed force is produced, the Lorentz force, which leads to a torque for rotation in the φ direction.

As is apparent from FIGS. 1 and 2, the electric currents through the coils, i.e. the rotation coil or φ coil 7 and the translation coil or Z coil 9, which is disposed within the φ coil 7, are at least mainly perpendicular to each other when the coils are energised so that both coils can cooperate with one and the same magnet system, which in the present example comprises the magnet 11 and the annular segment 13. The coils 7 and 9 can be energised simultaneously or independently of one another. Energisation is possible with a current whose direction and/or magnitude can change depending on the required force or the required torque.

Figure 3:
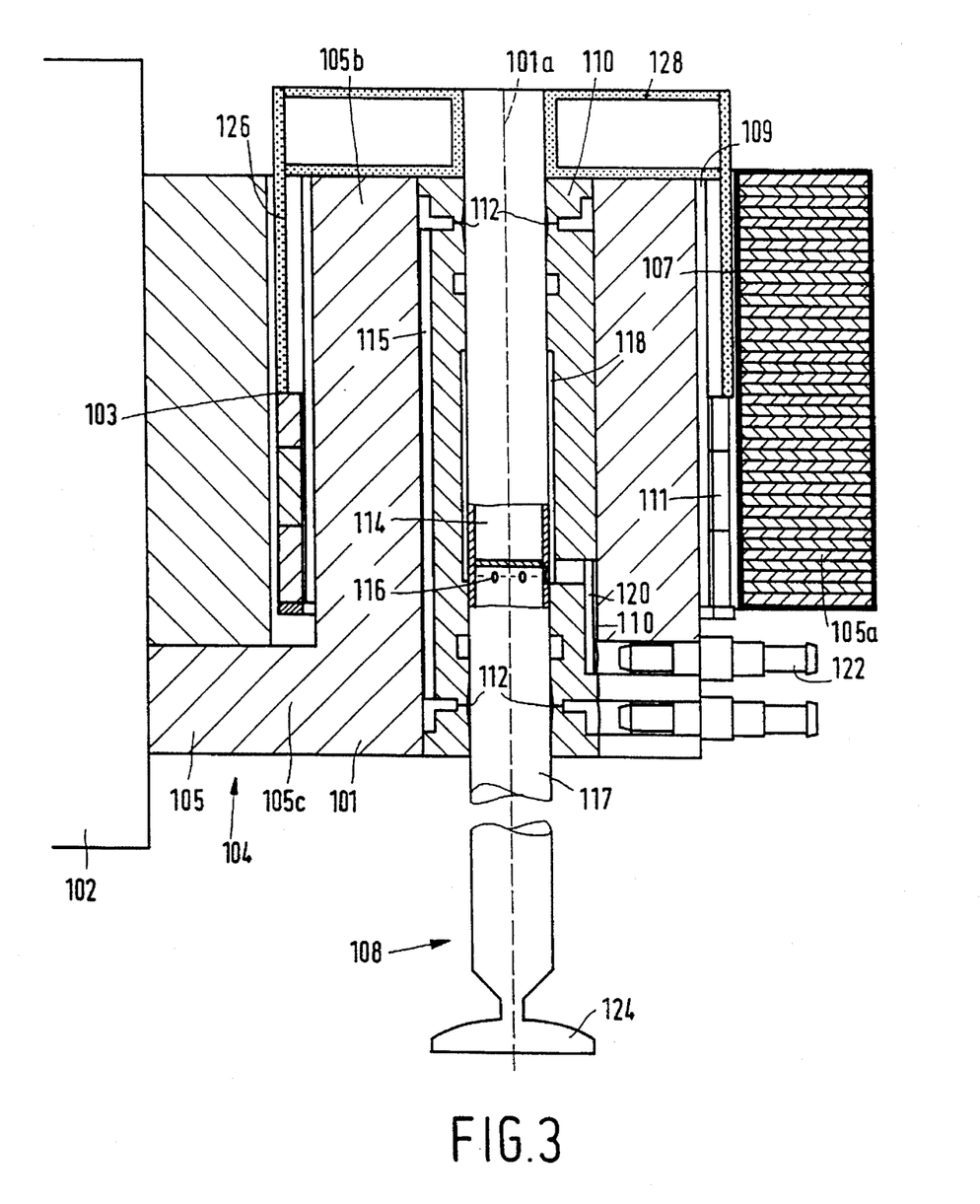
FIG. 3 is a longitudinal sectional view taken on the line III—III in FIG. 5 and showing a machine in accordance with the invention comprising a second embodiment of the actuator in accordance with the invention.
Figure 4:
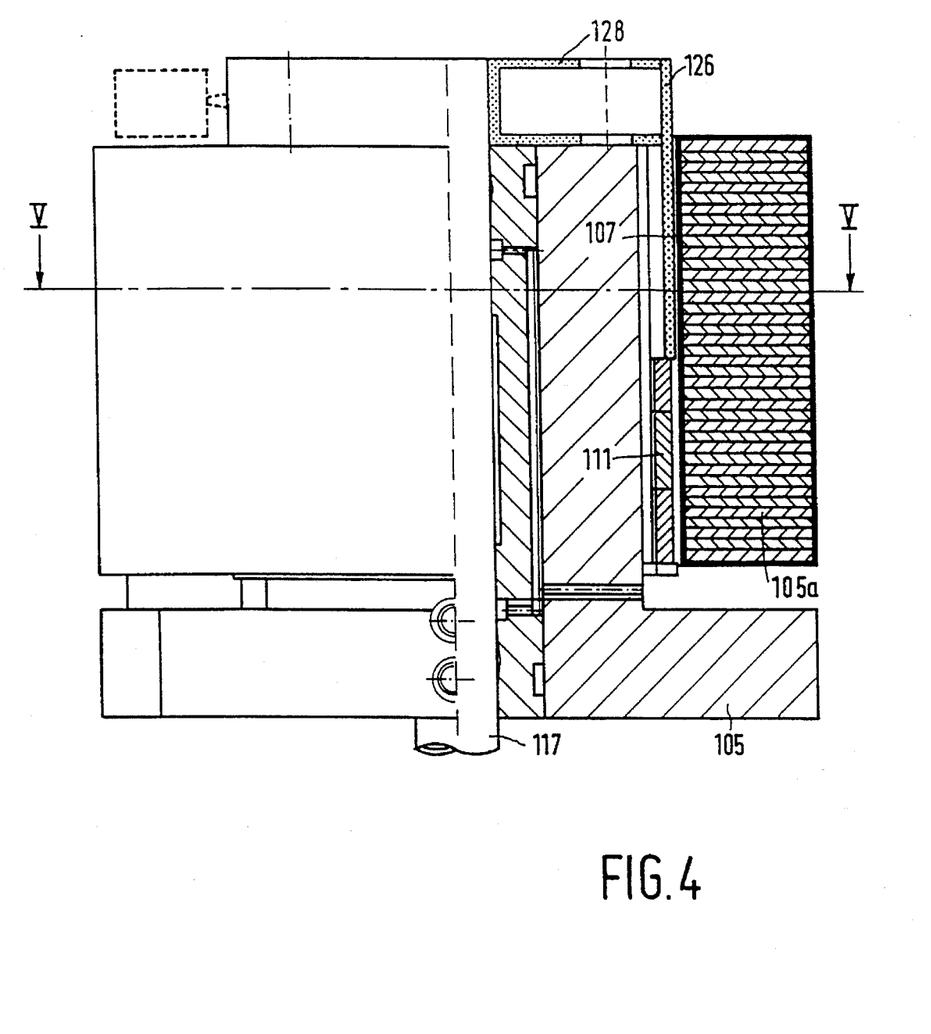
FIG. 4 shows the machine comprising a second embodiment of the actuator in accordance with the invention partly in a longitudinal sectional view taken on the line IV—IV in FIG. 5.
Figure 5:
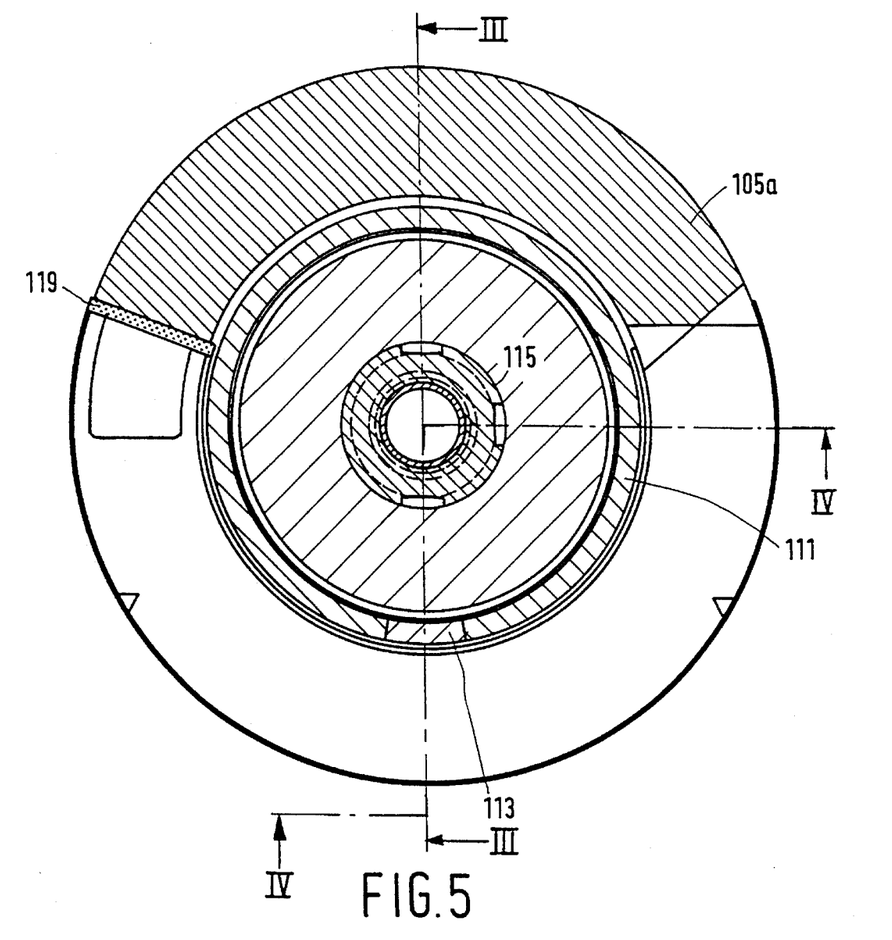
FIG. 5 is a cross-sectional view taken on the line V—V in FIG. 4 and showing the machine comprising the second embodiment of the actuator.

The machine in accordance with the invention shown in FIGS. 3, 4 and 5 is capable of picking up, holding, moving and positioning an object such as an electronic component. The machine comprises a frame 102, shown only diagrammatically, an electromagnetic actuator 10 in accordance with the invention, secured to the frame 102, and a vacuum system 108. The frame 102 may be a stationary frame or it may form part of a transport mechanism and may be constructed as, for example, a slide or a pivotal arm. The electromagnetic actuator 104 comprises a first actuator section 101 mounted on the frame 102 and a second actuator section 103 which is mounted in the first actuator section 101 so as be translatable and rotatable. The first actuator section 101 has a soft-magnetic yoke 105 comprising a cylindrical shell 105a, a central core 105b, and a bridge 105c connecting the shell 105a to the central core 105b. The shell 105a has a slot-shaped axial gap 119, which in the present case is filled with a non-magnetisable material to reinforce the shell. The first actuator section 101 further has a coil system comprising a toroidal coil 107 arranged around the shell 105a and a cylindrical coil 109 arranged around the core 105b. The actuator 104 has an actuator axis 101a, which is defined by a central bore 115 in the core 105b. The bore 115 accommodates a bearing sleeve 110 with air-bearings 112 for supporting a drive shaft 117 of the second actuator section 103 with extremely low frictional resistance. The drive shaft 117 is hollow and has an axial cavity 114 which, via ports 116 in the wall of the drive shaft, communicates with a vacuum space 118 in the first actuator section 101. The vacuum space 118 is coupled to a valve 122 via a duct 120 for connection to a vacuum pump. On the hollow shaft 117 a suction pad 124 is mounted.

The second actuator section 103 comprises a permanent magnet system for cooperation with the coils 107 and 109 via an air gap. The magnet system comprises a magnet 111 with a radially inward or outward magnetisation and in the present example consisting of three smacked annular parts. The annular magnet 113, which extends between the coils 107 and 109, has a permanent magnet segment 113 whose direction of magnetisation is opposed to that of the rest of the magnet 111. The magnet 111 is secured to a support 126, which is secured to the drive shaft 117 via a connecting disc 128.

In the present example the rotation coil 107 spans approximately 200° and the annular segment 113 covers approximately 215°, the rotation coil extending from the axial gap 119 and the annular segment 113 being disposed within the sector defined by the rotation coil 107. In order to guarantee that the segment 113 is always disposed opposite the rotation coil 107 the angle of rotation of the actuator section 103 can be limited by providing stops on both actuator sections 101 and 103.

The machine in accordance with the invention is suitable, for example, for mounting electronic components on a printed circuit board, particularly when Surface Mounted Device (SMD) technology is employed. When SMD technology is used the components are glued and soldered onto a printed circuit board. By means of the machine in accordance with the invention a component can be picked up from a feed system after the suction pad has been positioned relative to the component by means of the actuator in accordance with the invention used in the machine. Subsequently, the component can be moved towards the p.c. board and can be oriented relative to the p.c. board by energisation of the rotation coil 107. Subsequently, the component can be moved to the mounting position on the printed circuit board and pressed into an adhesive layer provided on the printed circuit board.

Preferably, the actuator in accordance with the invention is combined with a measurement system for determining a translational position and a rotational position of the one actuator section relative to the other actuator section. The measurement system can supply a first output signal representative of an actual translational position and/or a second output signal representative of an actual rotational position at desired instants during use of the actuator and can be used successfully in an actuator unit which, in addition to the actuator in accordance with the invention also comprises a control system for the actuator.

Figure 6:
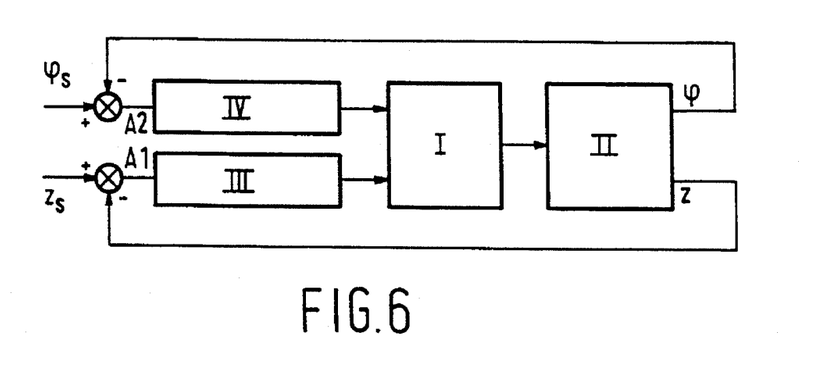
FIG. 6 shows diagrammatically an actuator unit in accordance with the invention, comprising a control system.

FIG. 6 is a block diagram showing an embodiment I of the actuator in accordance with the invention, which may be provided with a load, a measurement system II for supplying a first signal z representative of an actual translational position of the actuator and a second signal $\phi$ representative of an actual rotational position of the actuator. The signals z and $\phi$ are applied to an adder A1 and A2, respectively. In addition, a signal $z_s$ related to a desired translational position is applied to the adder A1. The difference signal from the adder A1 is applied to a controller III. The controller III controls the translation coil of the actuator. In addition to the signal $\phi$ a signal $\phi_s$ related to a desired rotational position is applied to the adder A2. A controller IV, to which the difference signal from the adder A2 is applied, controls the rotation coil of the actuator.

Figure 7:
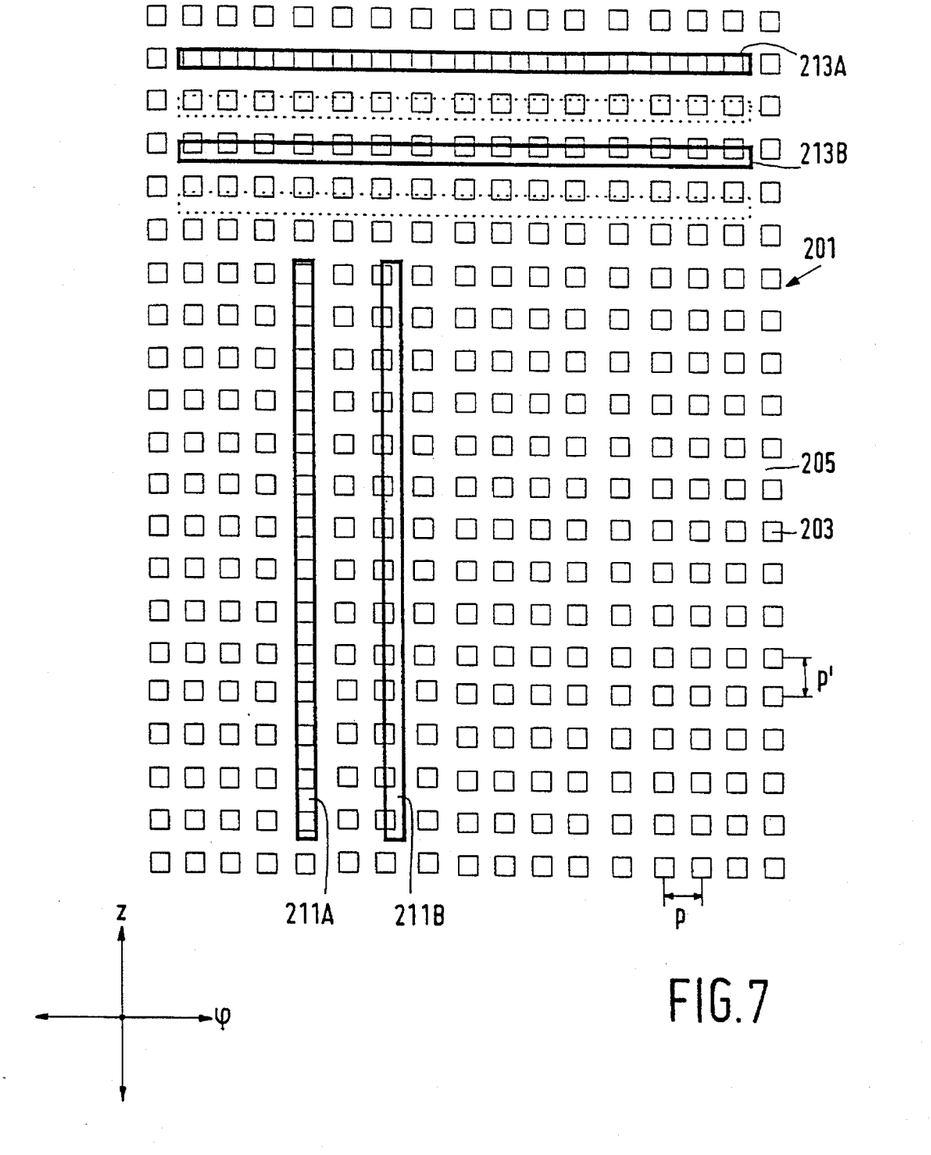
FIG. 7 shows a developed part of a cylindrical information carrier of a measurement system of the actuator unit in accordance with the invention.
Figure 8:
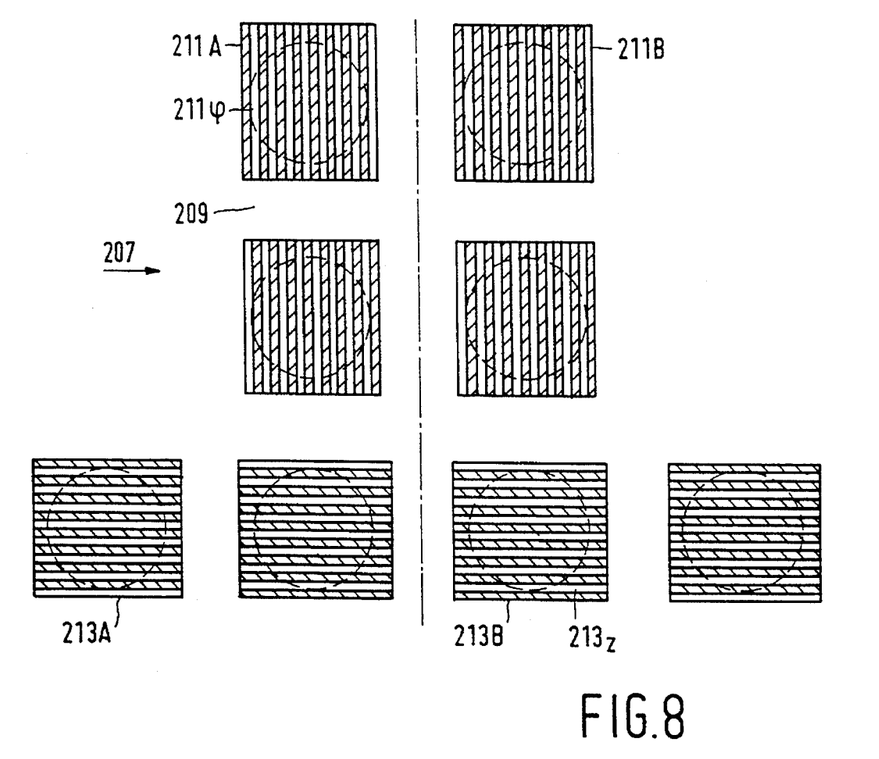
FIG. 8 shows diagrammatically a mask of the above-mentioned measurement system.
Figure 9:
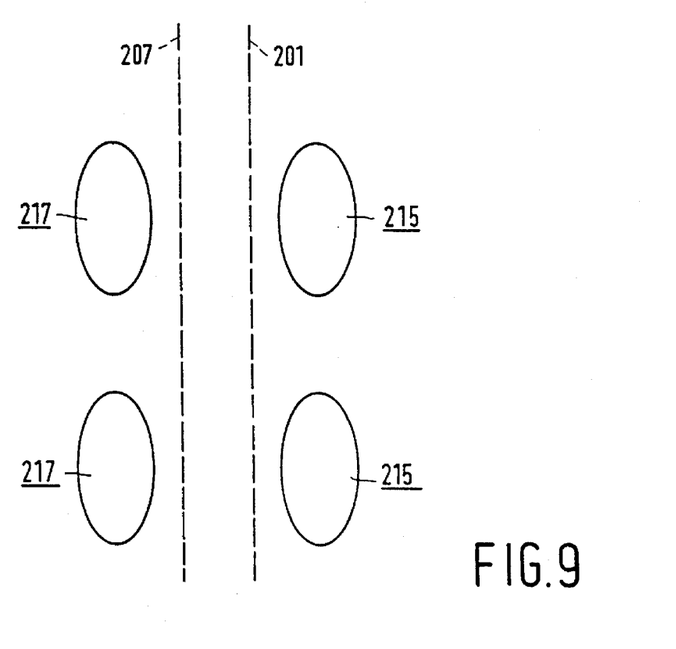
FIG. 9 shows diagrammatically an arrangement for said measurement system.

The measurement system shown in FIGS. 7, 8 and 9 comprises a cylindrical information carrier 201. The information carrier 201 comprises a transparent cylindrical body, for example from glass or a suitable synthetic resin, on which a non-transparent layer of, for example, aluminium is formed, for example by vacuum-deposition, in which apertures 205 are formed, for example by ablation by means of a laser beam, in order to form a pattern of transparent areas 205. The pattern of transparent areas 205 extends regularly in two directions z and $\phi$, the apertures having a square or circular shape. The information carrier 201, which is also referred to as an encoder cylinder, forms part of the movable actuator section of the actuator in accordance with the invention. In this respect reference is made to FIG. 2, where the movable second actuator section 3 includes such an information carrier 201. The information carrier 201 is connected to the magnet 11 and in the case of energisation of the toroidal coil 7 and/or the cylindrical coil 9, see also FIG. 1, it consequently performs the same movements as the magnet 11. The pattern of transparent areas 205 need not be provided over the entire circumference of the information carrier 201 but only over a circumferential angle equal to the angle of rotation of the movable actuator section. The measurement system in accordance with the invention further comprises a mask 207 with a pattern of transparent areas 209. The pattern of transparent areas 209 has sub-patterns 211A and 211B with slits $211_\phi$ which extend in the Z direction and sub-patterns 213A and 213B with slits $213_z$ which extend in the $\phi$ direction. The mask 207 is secured to the stationary actuator section of the actuator in accordance with the invention; in FIG. 1 this actuator section bears the reference numeral 1. A plurality of light-emitting diodes are disposed above the part 5b of the actuator section 1 and within the encoder cylinder. An equal plurality of photodiodes are disposed above the part 5a of the actuator section 1 and outside the encoder cylinder. The arrangement is such that the information carrier 201 and the mask 207 extend between, on the one hand, the light-emitting diodes and, on the other hand, the photodiodes. This arrangement is shown symmetrically, the light-emitting diodes being referenced 215 and the photodiodes being referenced 217.

By means of the measurement system used in the actuator unit in accordance with the invention it is possible to determine rotational and translational movements of the movable actuator section relative top the stationary actuator section. In the case of translation use is made of the slits $213_z$ which extend transversely of the direction of translation z, light-dark transitions will be observed in the photodiodes as a result of a relative movement of the slits $213_z$ and the apertures 203 in the information carrier 201. Likewise, light-dark transitions will be observed in the case of rotation but now as a result of a relative movement between the slits $211_\phi$, which extend transversely of the direction of rotation, and the apertures 203.

The slits $211_\phi$ and $213_z$ may have a transverse dimension of, for example 50 µm, corresponding to the size of the apertures 203. The length of the slits may correspond to a few times the pitch p and p', respectively, used in the information carrier 201. In the present example a comparatively large length equal to sixteen times the pitch has been selected in order to minimise the influence of a movement in one of the directions in the other direction. It is to be noted that the pitch p' in the direction of translation need not be equal to the pitch p in the direction of rotation.

The present measurement system uses four photodiodes 217 and one set of two pairs of sub-patterns 211A, 211B or 213A, 213B for measuring a movement in each direction of movement. Each of the sub-patterns has a plurality of parallel slits $211_\phi$ or $213_z$, so that each set has four groups of slits. In each set the groups of slits are offset from one another by a multiple of the sum of the pitch used in the information carrier +¼ of this pitch, also (p +¼p). By measuring two phase-shifted signals per direction it is possible to determine the direction of movement of the movable actuator section. The (relative) position of the movable actuator section with respect to the stationary actuator section is determined by counting the number of light-dark transitions.

It is to be noted that the invention is not limited to the exemplary embodiments shown herein.

We claim:

1. An electromagnetic actuator comprising two actuator sections which are translatable relative to one another along an actuator axis and which are rotatable about the actuator axis, a first actuator section comprising a coil system and a second actuator section comprising a permanent magnet system for cooperation with the coil system via an air gap, characterised in that the coil system is arranged on a magnetically conductive yoke and comprises a cylindrical translation coil and a toroidal rotation coil, which are coaxial with the actuator axis, and the permanent magnet system comprises an annular magnet, which is coaxial with the actuator axis, for cooperation with both the translation coil and the rotation coil, which magnet has a radial magnetisation which is interrupted by an annular segment, the magnetically conductive yoke having a central core around which the translation coil is arranged and a shell on which the rotation coil is disposed, which core and shell bound a space within which the annular magnet is disposed, the magnetically conductive yoke comprising a bridge connecting the central core and the shell.

2. An actuator as claimed in claim 1, characterised in that the shell is formed by an interrupted cylindrical wall of a magnetically conductive material.

3. An actuator as claimed in claim 1, characterised in that the shell has a slot-shaped gap situated near the bridge and extending parallel to the actuator axis.

4. An actuator as claimed in claim 1, characterised in that the annular segment is formed by a discontinuity in the annular magnet.

5. An actuator as claimed in claim 1, characterised in that the annular magnet and the annular segment together form a continuous ring, the annular segment being magnetised oppositely to the annular magnet.

6. An actuator as claimed in claim 1, characterised in that the first actuator section is a stationary section.

7. An actuator unit comprising an actuator as claimed in claim 1 and a measurement system for determining a translation position and a rotation position of the one actuator section relative to the other actuator section.

8. An actuator unit as claimed in claim 7, characterised in that the measurement system comprises a cylindrical information carrier disposed on one of the actuator sections and having a pattern of first transparent areas, and a unit disposed on the other actuator section and having a mask with a pattern of second transparent areas, a radiation source system and a radiation-sensitive sensor system arranged opposite the radiation source system, the pattern of first transparent areas and the pattern of second transparent areas, which extends parallel to said pattern of first transparent areas, extend between the radiation source system and the sensor system.

9. An actuator unit as claimed in claim 8, characterised in that a light-emitting diode is used as a radiation source and a photodiode is used as a sensor.

10. An actuator unit as claimed in claim 7, characterised by the presence of a control system comprising means for the comparison of an output signal of the measurement system, which output signal is representative of an actual translational position, with a signal representative of a desired translational position, resulting in a first difference signal, and for the comparison of an output signal of the measurement system, which output signal is representative of an actual rotational position, with a signal representative of a desired rotational position, resulting in a second difference signal, which difference signals are applied to a control unit for controlling the translation coil and the rotation coil.

11. A machine for picking up and positioning an object, comprising at least one actuator as claimed in claim 1.

12. A machine for picking up and positioning an object, comprising at least one actuator unit as claimed in claim 7.

* * * * *